United States Patent [19]

Pettersson

[11] Patent Number: 5,354,113
[45] Date of Patent: Oct. 11, 1994

[54] PLATFORM BODY COVERING MECHANISM

[76] Inventor: Kalervo Pettersson, SF, 31500 Koski TL, Finland

[21] Appl. No.: 30,097
[22] PCT Filed: Sep. 23, 1991
[86] PCT No.: PCT/FI91/00288
  § 371 Date: Mar. 10, 1993
  § 102(e) Date: Mar. 10, 1993
[87] PCT Pub. No.: WO92/05047
  PCT Pub. Date: Apr. 2, 1992

[30] Foreign Application Priority Data

Sep. 21, 1990 [FI] Finland ............................ 904648
Apr. 10, 1991 [FI] Finland ............................ 911732

[51] Int. Cl.$^5$ ............................................ B60J 11/00
[52] U.S. Cl. ................................... 296/98; 296/100
[58] Field of Search ....................... 296/98, 100, 105

[56] References Cited

U.S. PATENT DOCUMENTS

| | | | |
|---|---|---|---|
| 2,594,910 | 4/1952 | Germann | 296/98 |
| 3,086,811 | 4/1963 | Hartviksen | 296/98 |
| 3,488,087 | 1/1970 | Cox | 296/100 |
| 3,774,958 | 11/1973 | Thorpe | 296/98 |
| 4,784,427 | 11/1988 | Burgess | 296/98 |
| 4,792,178 | 12/1988 | Kokx | 296/98 |
| 4,854,630 | 8/1989 | Biancale | 296/100 |
| 4,874,196 | 10/1989 | Goldstein et al. | 296/98 |
| 4,909,563 | 3/1990 | Smith | 296/98 |
| 4,944,551 | 7/1990 | Hardy, Jr. | 296/100 |
| 4,966,406 | 10/1990 | Karasik et al. | 296/98 |
| 5,205,605 | 4/1993 | Haddad, Jr, | 296/98 |

FOREIGN PATENT DOCUMENTS

| | | |
|---|---|---|
| 3605814 | 8/1987 | Fed. Rep. of Germany . |
| 3734271 | 4/1989 | Fed. Rep. of Germany . |
| 2259721 | 10/1975 | France . |

*Primary Examiner*—Joseph Pape
*Attorney, Agent, or Firm*—Nixon & Vanderhye

[57] ABSTRACT

The invention relates to a platform body covering mechanism comprising a flexible cover and pulling devices operating in conjunction with each other, which pull the cover over the platform body and off it. The pulling devices comprise a pulling cable wire for pulling the cover over the platform body and a drum around which the cover is wound when it is removed from over tile platform body. At the edge of the cover is formed a reinforcement the end pieces of which move in the guides st the sides of the platform body. The guides are made curved so that they are closer to each other at the center part of the platform body. Thus, the reinforcement will bend upwards to form a curve at the center part of the platform body, so that the cover can be brought over the platform body even where the load placed on the platform body is higher than the sides of the platform body.

17 Claims, 10 Drawing Sheets

PLATFORM BODY COVERING MECHANISM

The invention relates to a platform body covering mechanism comprising a flexible cover and a drum around which the cover can be wound, and a pulling cable wire or similar pulling element by means of which the cover can be pulled over the platform body.

Sand and gravel are usually transported on the platform of a lorry without the platform being covered in any way. In this case it cannot be avoided that during transport some of the sand on the platform flies off the platform with the air current. This artificial sandstorm may, however, be extremely harmful to other vehicles on the road. When a vehicle moving at high speed runs into a cloud of sand, the effect is the same as that of sand blasting. There may be considerable damage to the vehicle's paint surface and windscreen.

To avoid sand dust it has been proposed that the platforms of lorries transporting sand should be covered. The known solutions for covering platform bodies have not, however, been practicable. Problems have arisen e.g. when the surface of the load has been uneven and at a higher level than the edges of the platform. The cover will then be obstructed by the load and cannot be pulled over the load.

The object of the present invention is, therefore, to eliminate the above-mentioned problems and to achieve a novel platform body covering mechanism intended for lorries. It is characteristic of the platform body covering mechanism relating to the invention that in pulling the cover over the platform body, the edge of the cover moving forward over the platform body is arranged to rise at least partially upwards so that the cover can be brought over the platform body even where the load on the platform body is higher than the sides of the platform body.

The invention is described below in detail, with reference to the appended drawings, in which FIG. 1 shows diagrammatically the platform body relating to the invention and its covering mechanism as seen from the side.

FIG. 2 corresponds to FIG. 1 and shows a second embodiment of the platform body and its covering mechanism.

Figure 6:
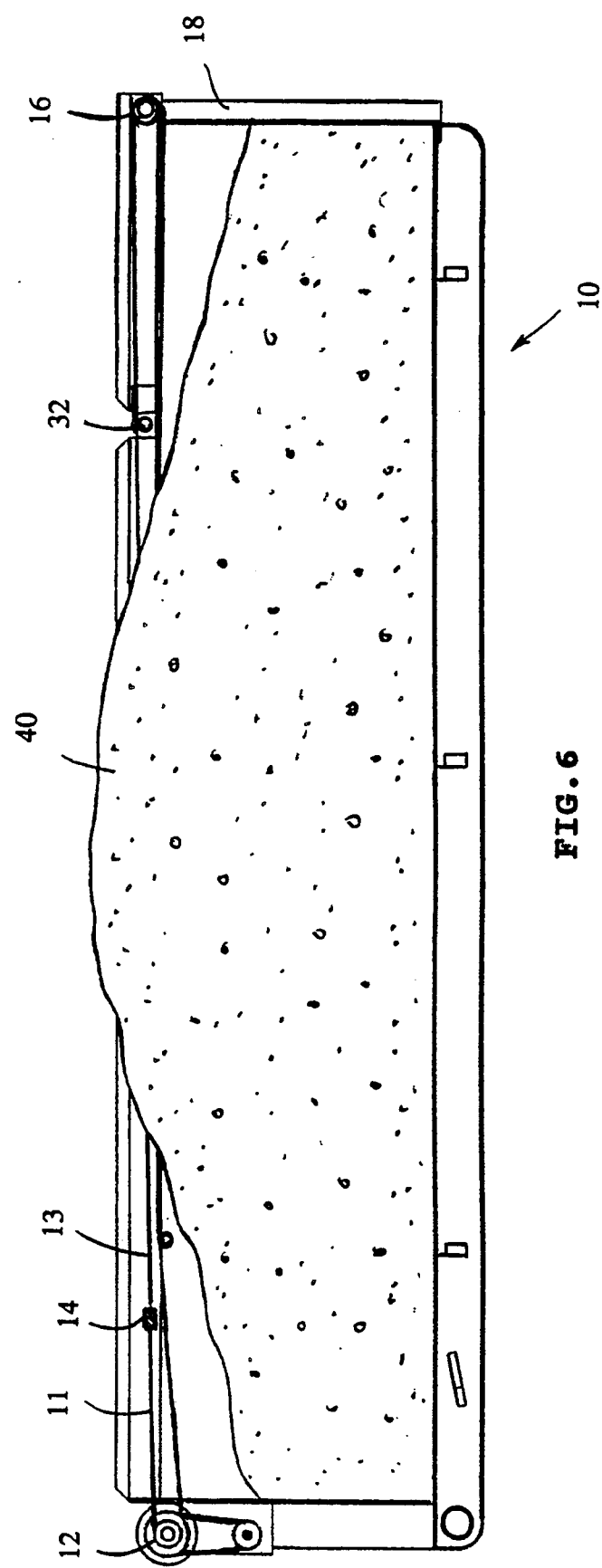
FIG. 6 shows the platform body and a third embodiment of the covering mechanism as seen from the side and as a cross section.
Figure 7:
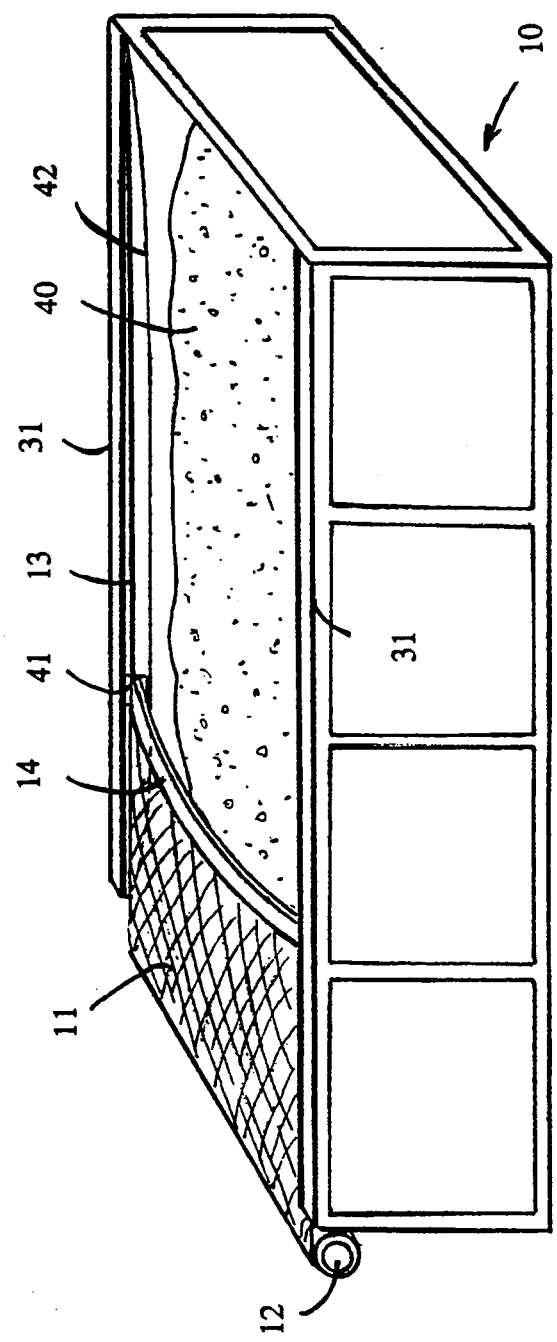

FIG. 7 corresponds to FIG. 6 and shows a perspective view of the platform body and the covering mechanism.

Figure 8:
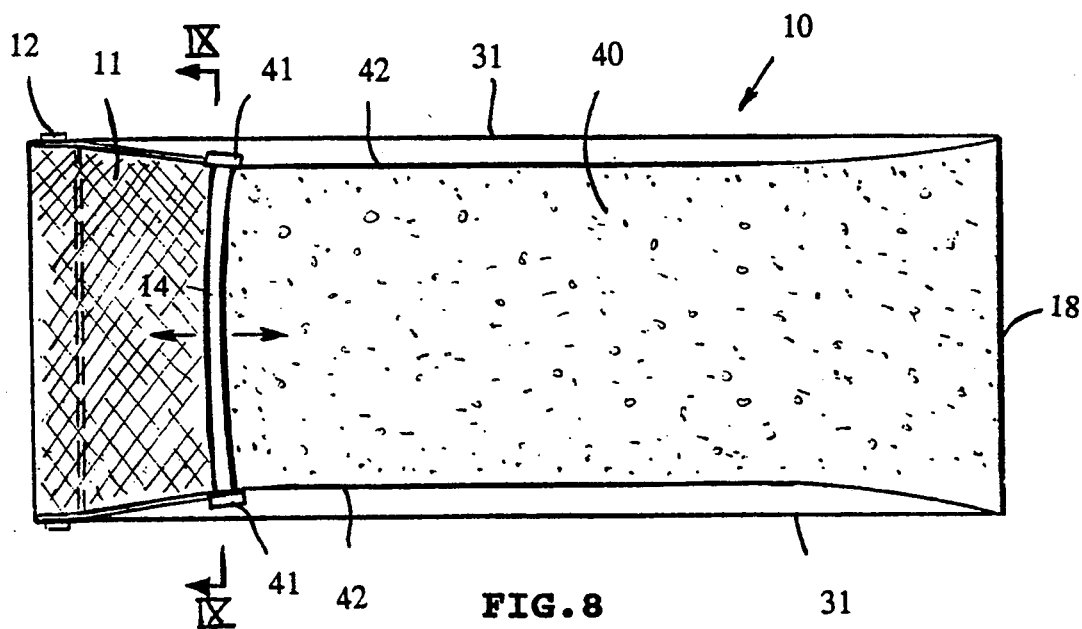

FIG. 8 shows the platform body and covering mechanism shown in FIGS. 6 and 7 as seen from above.

Figure 9:
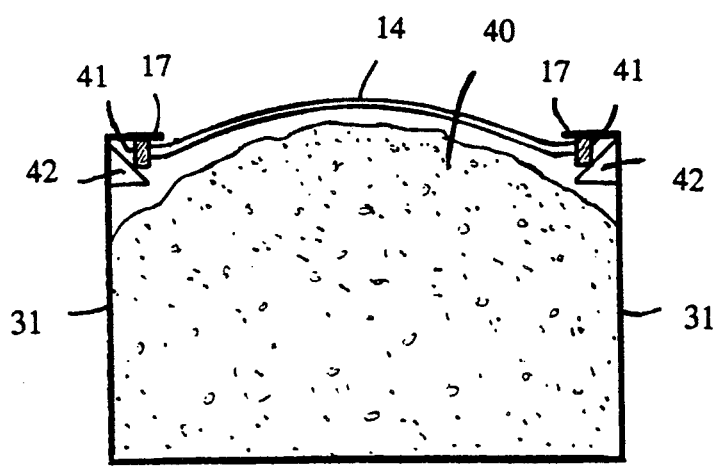

FIG. 9 shows a section of FIG. 8 along line IX—IX.

Figure 10:
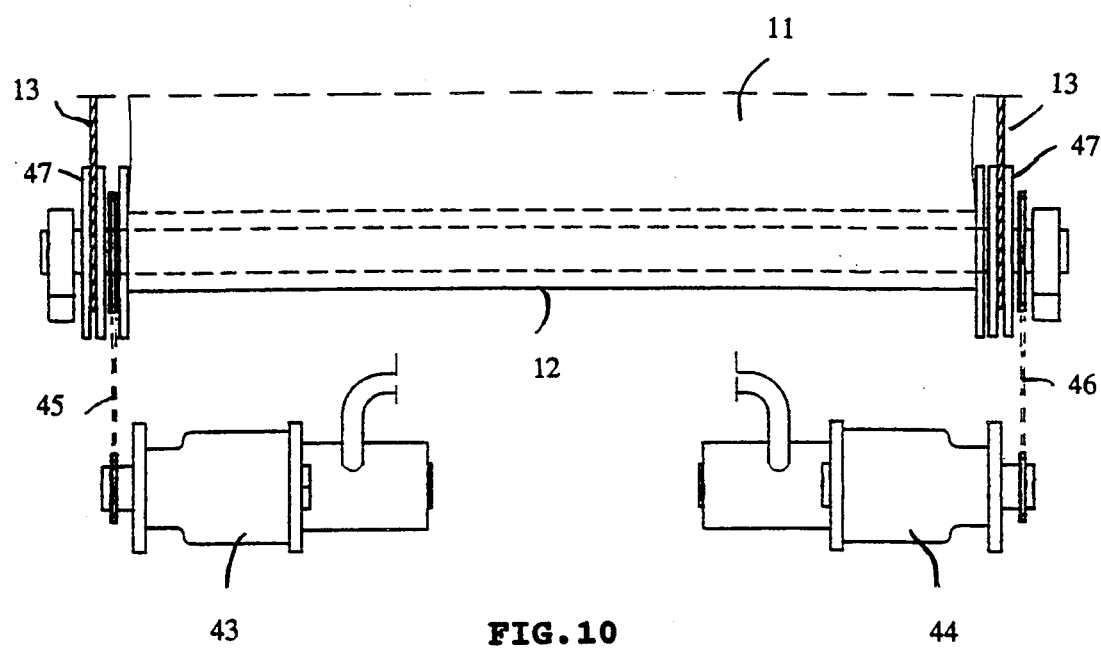
Figure 11:
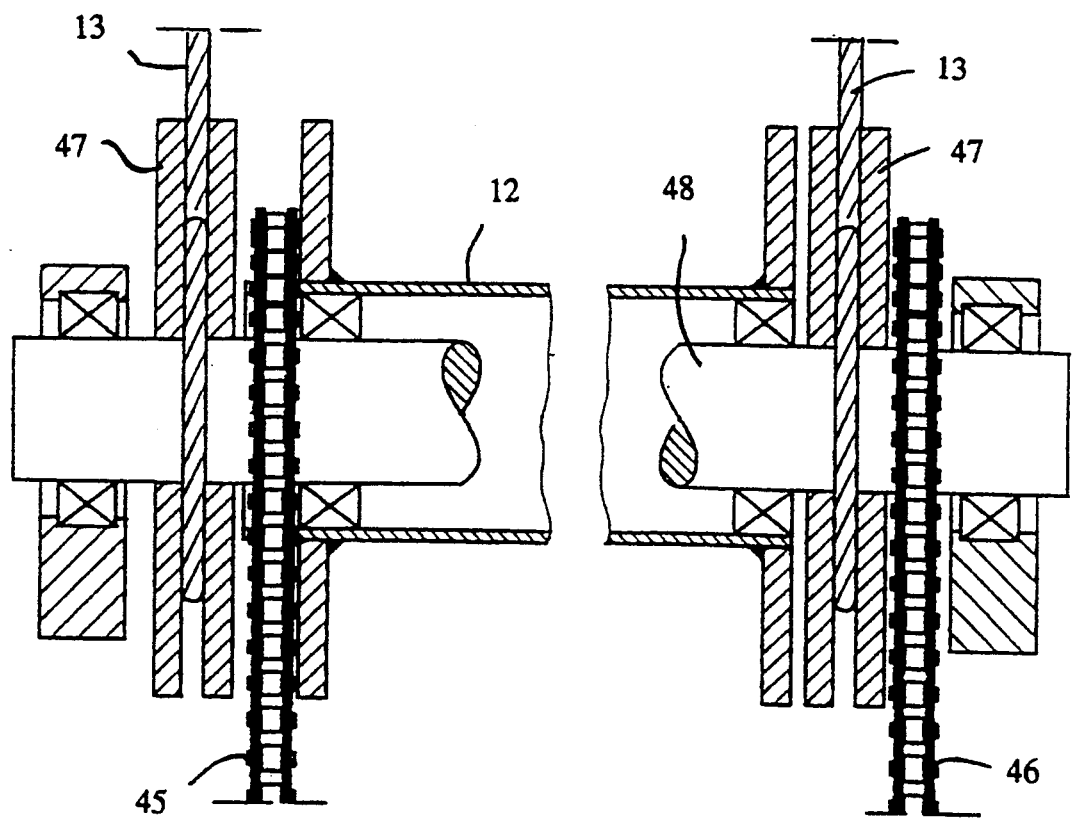

FIG. 10 shows diagrammatically the drum mechanism of the platform body covering mechanism and the hydraulic motors relating to it.

Figure 11:
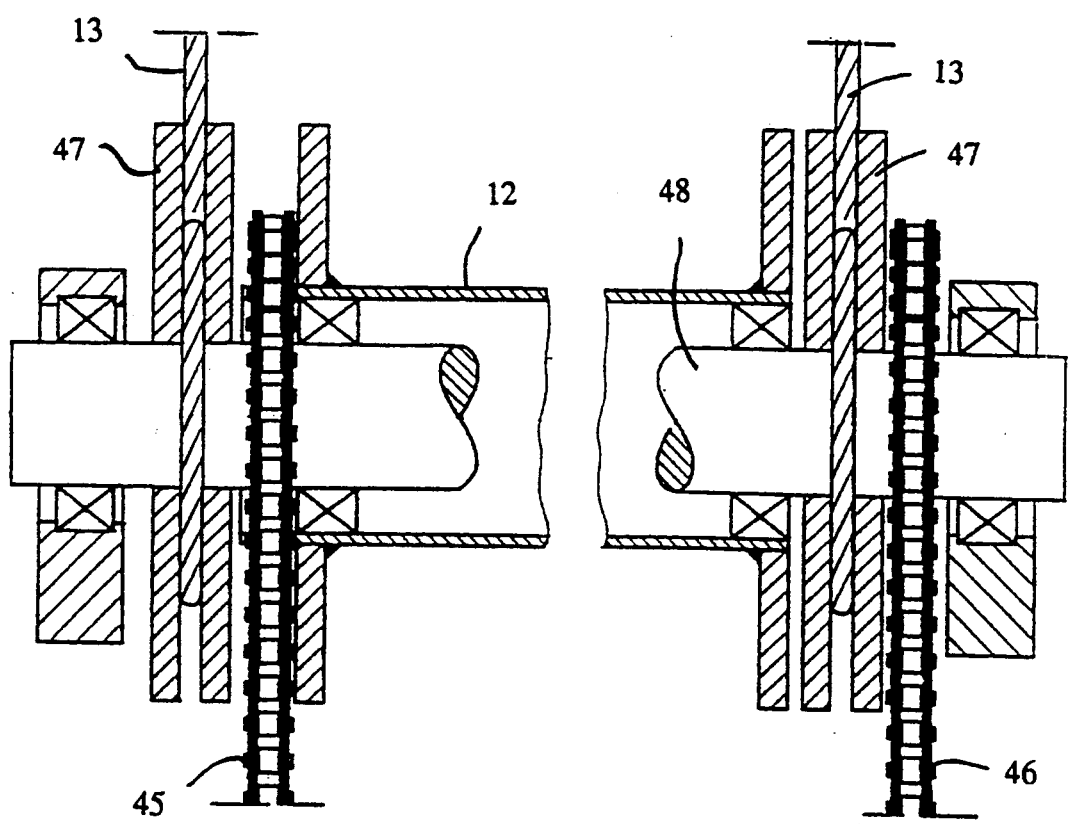

FIG. 11 shows a cross-sectional view of the drum mechanism of the covering mechanism shown in FIG. 10.

Figure 12:
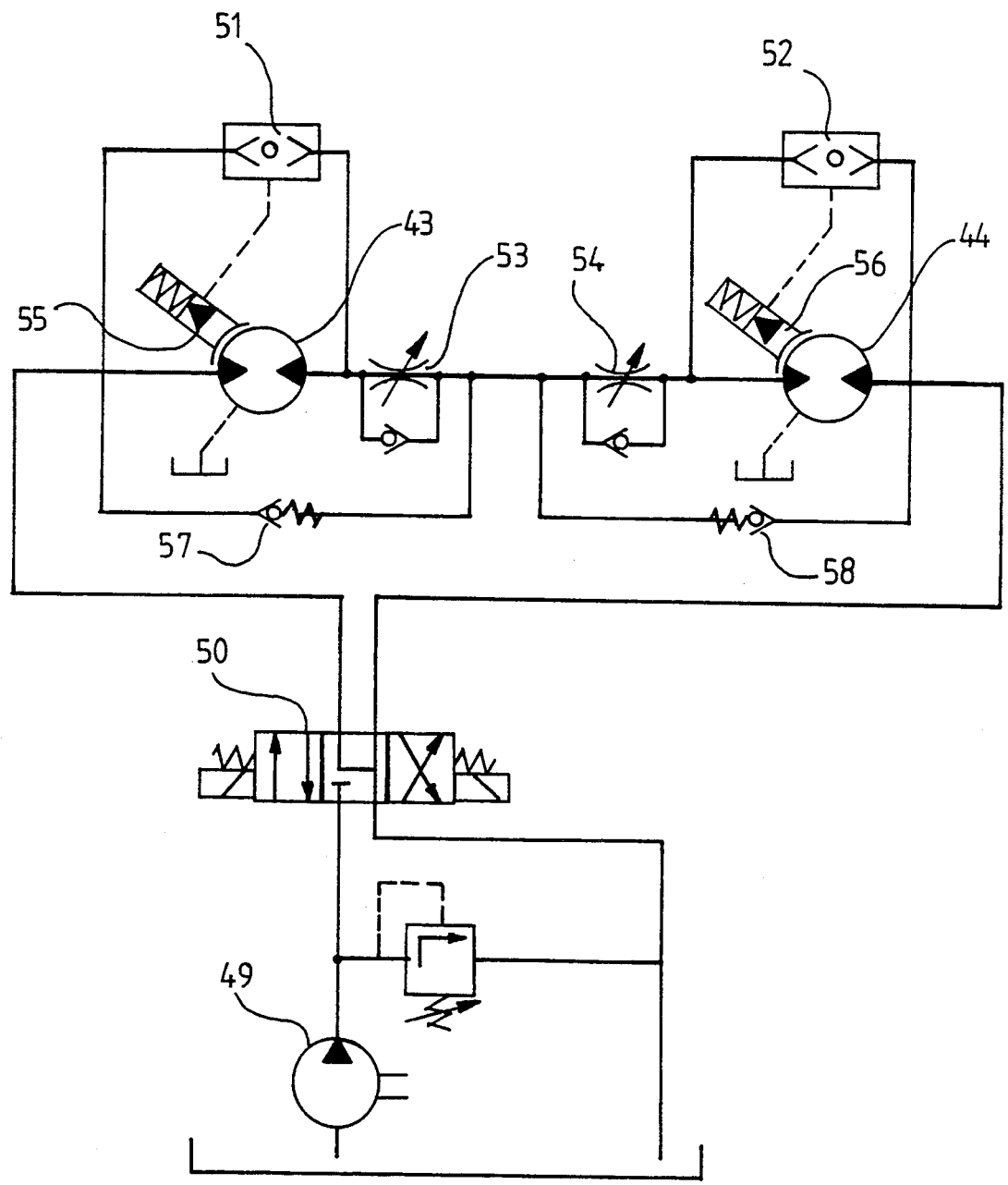

FIG. 12 shows the hydraulic diagram of the covering mechanism.

Figure 13:
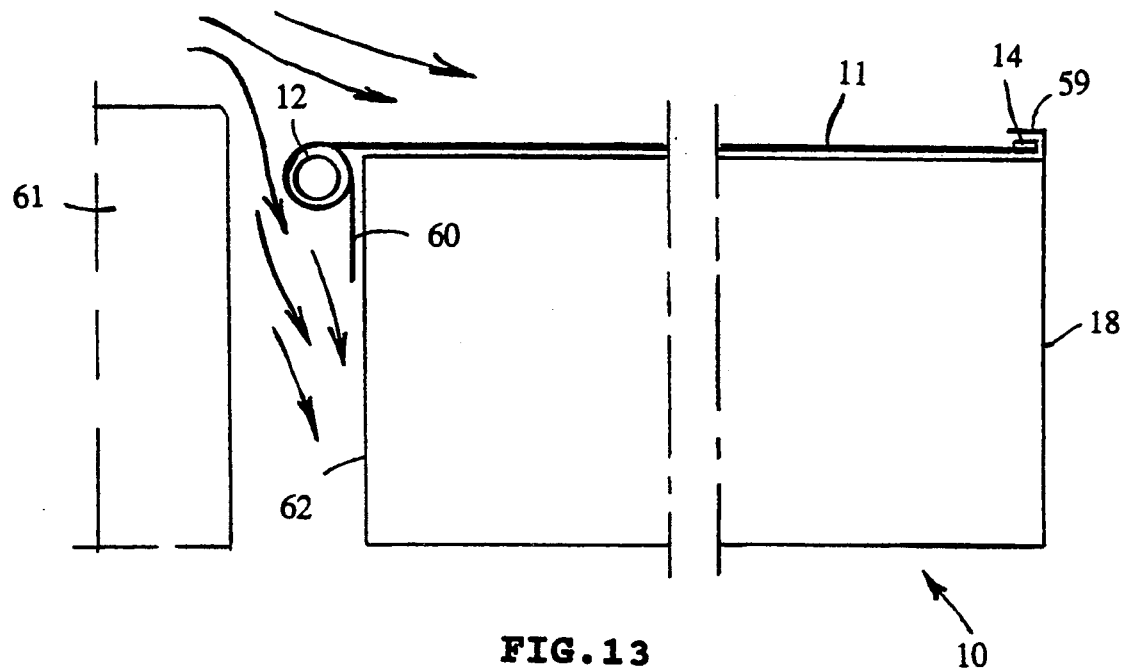

FIG. 13 shows diagrammatically the platform body as seen from the side when the cover is pulled over the load.

Figure 14:
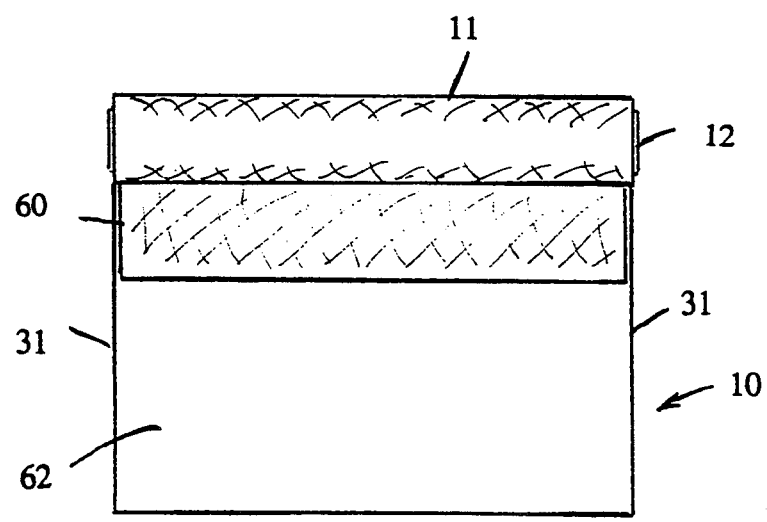

FIG. 14 shows the platform body shown in FIG. 13 as seen from the front.

FIG. 1 shows a diagrammatic side view of the platform body 10, over which the cover 11 can be pulled. The cover 11 is wound around the drum 12, which is located at the front of the platform looking in the direction of travel of the vehicle. The covering mechanism also comprises a cable wire 13, to which the edge 14 of the cover 11 is fastened. The cover can be pulled over the platform body by means of the cable wire 13 and rewound onto the drum 12 when it is to be removed from over the platform. The structure is described in greater detail in connection with the following figures.

FIG. 2 shows a second embodiment of the covering mechanism of the platform body 10, in which the cover 11 and the drum 12, around which the cover 11 is wound can be seen in greater detail. The drum 12 located at the front of the platform body 10 is driven by a hydraulic motor 15, which takes its driving power from the hydraulic system of the vehicle. The figure shows that a cable wire reel is connected to the drum 12 so that the cable wires 13 at the sides of the platform also run through the drum 12. At the opposite end of the platform body, that is, at the rear end of the platform, the cable wires 13 are led through sheaves 16.

The rear edge of the cover 11, that is, the edge which moves at the front when the platform body is being covered, is fastened to the cable wires 13 at points 14 at the rear corners of the cover. When the cover 11 is pulled over the platform body 10, this takes place in such a way that the drum 12 is rotated by means of the hydraulic motor 15, whereupon the cover 11 unwinds from the drum 12 and the cable wires 13 pull the cover from the edge 14 over the platform 10. Both top edges of the platform body 10 form projections 17, which protect the cable wires 13 running at both sides of the platform.

The tailgate 18 of the platform body 10 may be one that can be raised for unloading the load by tipping. In this case there are two possible alternatives for arranging the sheaves 16 for the cable wires 13. According to the alternative shown in FIG. 2, the sheaves 16 are fastened to the sides of the platform body 10, in which case the sheaves do not rise up together with the tailgate 18. In this solution the tailgate 18 cannot be lifted up when the cover 11 is over the entire platform body 10.

If, on the other hand, the sheaves 16 of the cable wires 13 are fastened to the rising part of the lifting mechanism of the tailgate 18, then the tailgate 18 can be lifted up even when the cover 11 is completely over the platform body 10. When the tailgate 18 is up, the cable wires 13 rest on the turning joints 32 of the tailgate, or alternatively on the walls of the protective tubes for the cable wires. This can be done since neither the cover 11 nor its pulling cable wires 13 need to be moved while the tailgate 18 of the platform body 10 is up.

Figure 3:
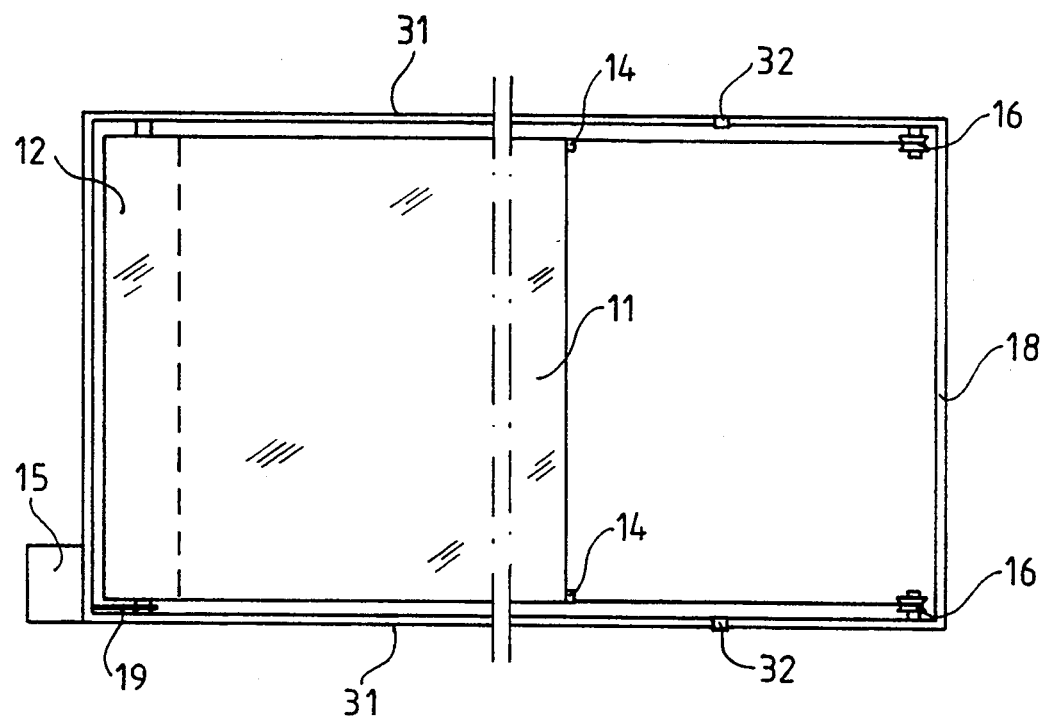
FIG. 3 shows the platform body shown in FIG. 2 and its covering mechanism as seen from above.

FIG. 3 shows the platform body 10 shown in FIG. 2 and its covering mechanism as seen from above. On the left side of the figure can be seen, mounted on bearings on the sides 31 of the platform, the drum 12 around which drum the cover 11 is partially wound. The pulling cable wires 13 run on the left in the figure, through the cable wire reels situated in conjunction with the drum 12. At the opposite end of the platform body 10, that is, at its rear part, on the right in FIG. 3, the pulling cable wires run through the sheaves 16, which are also mounted on bearings on the sides 31 of the platform.

The cover 11 is fixed by its corners 14 to the cable wires 13 running at the side of the platform body 10, so that the cover 11 can be pulled, by means of cable wires 13, over the platform body 10, that is to the right in FIG. 3. The cover 11 is removed from over the platform body by winding it around the drum 12. The movements in both directions are carried out so that the drum 12 is rotated in the desired direction by means of the hydraulic motor 15, which takes its driving power from the vehicle's hydraulic system.

Figure 4:
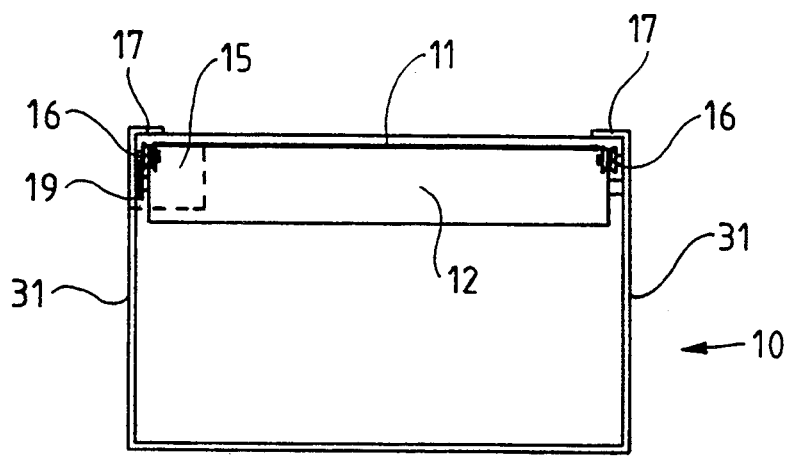
FIG. 4 shows the platform body shown in FIG. 2 as seen from the rear.

In FIG. 3 the cable wires 13 can be seen at the sides of the platform body, because the protective projections placed over the cable wires 13 are not shown in the figure. The projections are shown in FIGS. 2 and 4 by reference number 17. The purpose of the projections is to protect the cable wires 13 when the platform is being loaded. At the same time the projections also seal any gaps remaining between the cover 11 and the sides 31 of the platform body 10.

FIG. 4 shows a cross section of the platform body 10 shown in FIG. 2. The figure shows the drum 12 mounted on bearings on the sides 31 of the platform, around which drum the cover 11 has been wound. The hydraulic motor 15 rotates the drum 12 through a transmission element 19. Also the cable wire sheaves 16 mounted on bearings on the sides 31 and the protective projections 17 above them can be seen in FIG. 4.

Figure 5:
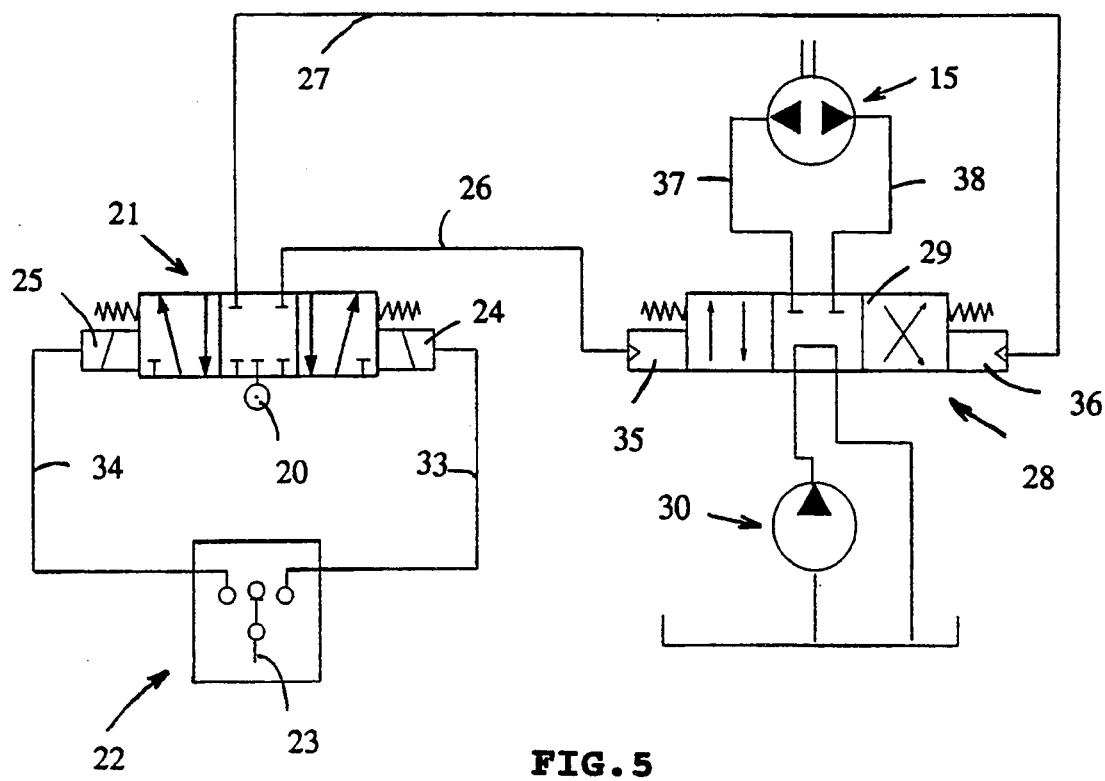
FIG. 5 shows the hydraulic diagram of the covering mechanism of the platform body shown in FIG. 2.

FIG. 5 shows the actuator diagram of the covering mechanism shown in FIG. 2. The vehicle's electric, pneumatic and hydraulic systems are used as driving power. FIG. 5 shows the actuators in the resting position so that the platform body cover is not moving.

The main components in the actuator diagram in FIG. 5 are the rocker-arm switch 22, the pneumatic magnetic valve 21, the pneumatic-hydraulic control valve 28 and the hydraulic motor 15. The equipment operates basically in such a way that the hydraulic motor 15 can be made to rotate in the desired direction by controlling with the rocker-arm switch 22.

When the rocker arm 23 of the rocker-arm switch 22 in FIG. 5 is turned, for example, to the right, the circuit 33 switches on the electric current to the control coil 24 of the pneumatic valve 21. The pneumatic valve 21 will then supply the compressed air taken from the vehicle's pneumatic system 20 through pipe 26 to the pneumatic cylinder 35 of the hydraulic valve 28. At the same time the stem 29 of the hydraulic valve 28 moves to the right in FIG. 5 and the hydraulic fluid pumped by the hydraulic pump 30 can pass along pipe 37 to the hydraulic motor 15, thus rotating the hydraulic motor, for example clockwise. This direction may be, for example, that direction of rotation of the drum 12 which winds the cover 11 from the drum onto the platform body 10.

If, on the other hand, the rocker arm 23 of the rocker-arm switch 22 is turned in the opposite direction, that is, to the left in FIG. 5, then the circuit 34 switches on the electric current to the control coil 25 of the pneumatic valve 21. The pneumatic valve 21 will then supply compressed air taken from the vehicle's pneumatic system 20 through pipe 27 to the pneumatic cylinder 36 of the hydraulic valve 28. At the same time the stem 29 of the hydraulic valve 28 moves to the left in FIG. 5 and the hydraulic fluid pumped by the hydraulic pump 30 can correspondingly pass along pipe 38 to the hydraulic motor 15, thus rotating the hydraulic motor anticlockwise. This direction is then that direction of rotation of the drum 12 which winds the cover 11 from over the platform body 10 onto the drum 12.

The hydraulic motor 15 is connected to the drum 12 of the platform body 10 through the transmission element 19, and a cable wire reel is connected to the drum. The hydraulic motor 15 will thus move both the drum 12 and the cable wire 13 at the same time. When the cover 11 is pulled over the platform body 10, this takes place by means of pulling with cable wire 13. Similarly, when the cover 11 is pulled off the platform body, it is wound around the drum 12.

FIG. 6 corresponds to FIG. 1 and it shows a diagrammatic side view of the covering mechanism of the platform body 10 in accordance with the third embodiment. In this figure the gravel load 40 placed on the platform body 10 is higher than the sides of the platform and thus pulling the cover 11 over the load cannot be carried out by means of the mechanism shown in FIG. 1. The solution relating to the invention is shown in greater detail in FIG. 7.

FIG. 7 shows the platform body 10 shown in FIG. 6 and its covering mechanism as a perpective view. The figure shows that the rear edge 14 of the cover 11 unwound from the drum 12 is curved upwards. Thanks to the curved rear edge 14 the cover 11 can be pulled over the load 40 even where the load 40 is higher than the sides 31 of the platform 10. The mechanism by means of which the curving of the rear edge 14 is achieved is shown in the following figures.

FIG. 8 shows the platform body 10 shown in FIGS. 6 and 7 and the covering mechanism as seen from above. In removing the cover 11 from over the load 40, it is wound onto the drum 12 and the cover 11 is pulled over the load 40 by means of the cable wires running on the inside of the sides 31. The figure shows that the rear edge 14 of the cover 11 is slightly curved. The purpose of this is to raise the rear edge 14 of the cover 11 slightly upwards in the middle so that the cover 11 can be pulled over the load 40, even where the load 40 is higher than the sides of the platform 10.

The rising of the rear edge 14 of the cover 11 has been achieved by attaching a flexible reinforcement 14 made of reinforced plastic to the rear edge of the cover, the reinforcement being slightly curved upwards in the middle. The end pieces 41 of the reinforcement 14 are placed so that they move on the rails 42, which are attached to the edges of the platform 10. The rails 42 are made curved so that the distance between them in the centre part of the platform 10 is smaller than at the front and rear ends of the platform.

When the cover 11 is wound up on the drum 12, the reinforcement 14 lies freely in the vicinity of the drum 12. When the cover 11 is pulled over the load 40 the end pieces 41 of the reinforcement 14, which pieces move along the rails 42, draw closer to each other, whereupon the reinforcement 14 bends upwards to form a curve. In this way the cover 11 can be pulled even over a high load 40. Once the cover 11 has been pulled over the platform 10 completely, the end pieces 41 of the reinforcement 14, which pieces move along the rails 42, draw away from each other again, and the reinforcement 14 straightens out again almost completely. In this way the cover 11 is made to settle tightly against the tailgate 18 of the platform at the rear edge of the platform 10.

FIG. 9 shows a vertical section of FIG. 8 at the rear edge reinforcement 14 of the cover 11. The figure shows that the reinforcement 14 has bent upwards in the middle because the rails 42 have pressed the end pieces 41 of the reinforcement 14 towards each other. In this way the cover 11 can be pulled over the load 40 even where the load 40 is higher than the upper edge of the sides 31 of the platform 10. This method is required especially in connection with chip or gravel loads, which are often made too high. In this solution the rear edge 14 of the cover 11 is not obstructed by the raised load 40.

FIG. 10 shows diagrammatically the drum mechanism of the platform body covering mechanism and the hydraulic motors 43 and 44 relating to it. In this figure the cover 11 is wound onto the drum 12 so that the hydraulic motor 43 rotates the drum 12 by means of the chain 45. Correspondingly, the cover 11 is pulled off the drum 12 so that the hydraulic motor 44 rotates the cable wire wheels 47 on both sides of the platform 10 by means of the chain 46, which wheels move the pulling cable wires 13 of the cover 11.

The cover 11 is arranged so as to stay suitably tight at each moment so that during the movements of the cover 11 in opposite directions, the hydraulic motors 43 and 44 will operate in conjunction with each other. When the hydraulic motor 43 winds the cover 11 onto the drum 12, the hydraulic motor 44 brakes the cable wire wheels 47. Correspondingly, when the hydraulic motor 44 pulls the cover 11 off the reel 12 by means of cable wires 13, it is the hydraulic motor 43 rotating the reel 12 that brakes.

FIG. 11 shows the drum mechanism in greater detail as a sectional view. The figure shows that the chain 45 of the hydraulic motor rotates the drum 12 onto which the cover is wound. The chain 46 of the other hydraulic motor, on the other hand, rotates the shaft 48 to which the cable wire wheels 47, situated on both edges, are connected. Pulling the cover from the reel is effected by means of the cable wires 13 mounted on the cable wire wheels 47.

When the cover is being wound onto the drum 12, the cable wires 13 are kept tight by braking the rotational movement of the shaft 48 and the cable wire wheels 47. Correspondingly, when the cover 11 is being pulled off the reel 12 by means of the cable wires 13, the rotational movement of the reel 12 is braked.

FIG. 12 shows the hydraulic diagram of the covering mechanism, in which the hydraulic motor 43 rotating the cover reel and the hydraulic motor 44 rotating the cable wire wheels are rotated by means of the hydraulic pump 49. Operations taking place in different directions are controlled by means of the control valve 50. The hydraulic circuits of both hydraulic motors 43 and 44 are identical and they operate in conjunction with each other. In the hydraulic circuit, the hydraulic motors 43 and 44 incorporate change-over valves 51 and 52, resistance countervalves 53 and 54, brakes 55 and 56 and countervalves 57 and 58.

When the hydraulic motor 44 pulls the cover off the reel onto the load by means of the cable wires, the hydraulic motor 43, which rotates the reel, brakes. Correspondingly, when the hydraulic motor 43 winds the cover onto the drum, the hydraulic motor 44 brakes the cable wire wheels. Thus the cover and its cable wires are always suitably tight.

In practice the speeds of rotation of the cover reel and the cable wire wheels vary in relation to each other. This is due to the fact that when more cover or cable wire winds onto the pulling reel, its effective diameter increases. It will thus always wind the cover or cable wire faster at the final stage, although the speed of rotation of the pulling reel remains the same. Correspondingly, the effective diameter of the delivering reel decreases, whereupon it delivers less cover or cable wire per rotation. As a result the speed of rotation of the delivering reel increases continuously towards the end.

The mechanism shown in FIGS. 10, 11 and 12 meets well the requirements set for changing the speeds of rotation in relation to each other. In the equipment put forth the operation has been made automatic so that the pulling of the cover and of the cable wire both take place by means of their own hydraulic motors operating in conjunction with each other. Thus the pulling hydraulic motor reduces the speed of rotation automatically at the same time as the speed of rotation of the delivering, or braking hydraulic motor increases.

FIG. 13 shows the tightening of the cover 11 when the cover is pulled over the platform body 10 completely. The figure shows that the rear edge 14 of the cover has moved forward under the flap 59 located at the tailgate 18 of the platform 10. At the sides the cover 11 is under the projections 17 at the upper edges of the sides 31 of the platform 10, as can be seen in FIG. 4.

The sealing of the front edge of the platform 10 is arranged so that at the front end of the cover 11 a wind shield 60 is wound together with the cover on the reel 12. When the cover 11 unwinds from the reel 12, during the last rotation on the reel 12, the wind shield 60 also unwinds from the reel 12 and remains hanging at the front of the platform 10, outside it, as shown in FIG. 13. Since the air current caused by driving is directed downwards between the lorry's cabin 61 and the platform body 10, the wind shield 60 is pressed against the front wall 62 of the platform body 10. The front edge of the cover 11 is thus sealed. The air current is in this case not able to pass between the cover 11 and the load.

FIG. 14 shows the platform body shown in FIG. 8 as seen from the front. The cover 11 has been unwound completely from reel 12 onto the platform body 10, whereupon also the wind shield 60 has unwound from the reel 12. The wind shield 60 remains hanging freely from the reel 12 and the downward air current caused by driving presses the wind shield tightly against the front wall 62 of the platform body 10.

It is obvious to one skilled in the art that the different embodiments of the invention may vary within the scope of the claims presented below.

I claim:

1. A platform body covering mechanism for pulling a cover over and off a platform body, comprising:
   a flexible cover;
   at least a first cable connected to said flexible cover;
   at least a first cable wheel engaging said first cable for effecting movement thereof;
   a drum rotatable about an axis of rotation, and around which said flexible cover is wound and from which it is unwound;
   first and second hydraulic motors driven by a hydraulic pump, and connected to a hydraulic circuit, said first and second hydraulic motors operatively connected to said first cable wheel to effect movement thereof to cause said first cable wheel to move said first cable and thereby pull said flexible cover over or off a platform body; and
   a plurality of resistance countervalves connecting said hydraulic motors to said hydraulic pump said hydraulic circuit so that when said first hydraulic motor is operating to move said first cable wheel said second hydraulic motor is braking and vice versa, so that said flexible cover is kept taut when said flexible cover is moving over and off the platform body, being unwound from and wound on said drum.

2. A covering mechanism as recited in claim 1 the platform body comprises a first edge, and wherein said first cable wheel is mounted at a first end of said platform body first edge, and a sheave is mounted at a second end of said first edge, opposite said first end; and wherein said first cable comprises a loop of cable disposed at said first edge of the platform body, and wherein said first cable wheel is mounted for rotation with a shaft which is located inside said drum, and wherein said first cable loop passes over said first cable wheel and said sheave.

3. A covering mechanism as recited in claim 2 wherein said first cable wheel is mounted on a first end of said shaft adjacent a first end of said drum, and wherein said shaft has a second end opposite said first end of said shaft; and adjacent a second end of said drum; and wherein said first hydraulic motor is operatively connected to said shaft adjacent said first end thereof, and said second hydraulic motor is operatively connected to said shaft adjacent said second end thereof.

4. A covering mechanism as recited in claim 3 wherein each of said first and second motors is connected adjacent to said first and second ends of said shaft by a sprocket mounted on said shaft and a chain connected between said sprocket and said motor.

5. A covering mechanism as recited in claim 2 wherein the platform body has a second edge opposite and parallel to said first edge; and further comprising a second cable and a second cable wheel; and wherein said second cable wheel is mounted at a first end of said platform body second edge, and a second sheave is mounted at a second end of said second edge, opposite said first end; and wherein said second cable comprises a loop of cable disposed at said second edge of said platform body, and wherein said second cable wheel is mounted for rotation with said shaft, and wherein said second cable loop passes over said second cable wheel and said second sheave.

6. A covering mechanism as recited in claim 5 wherein each of said first and second motors is connected adjacent to said first end and second ends of said shaft by a sprocket mounted on said shaft and a chain connected between said sprocket and said motor.

7. A covering mechanism as recited in claim 1 wherein said flexible cover has a leading edge of relatively stiff but bendable material, and wherein said leading edge material is mounted at opposite ends thereof to first and second tracks disposed along first and second opposite edges of the platform body, said tracks being closer together adjacent a center portion thereof than adjacent said drum so that as said flexible cover is pulled over the platform body and leading edge material bends upwardly.

8. A covering mechanism as recited in claim 7 further comprising a flexible wind shield attached to said flexible cover remote from said leading edge thereof and windable on and unwindable from said drum with said flexible cover, said flexible wind shield hanging down substantially perpendicular to said first axis of rotation when and only when said leading edge of said flexible cover is at a position remote from said drum.

9. A covering mechanism as recited in claim 1 wherein said flexible cover has a leading edged extending substantially parallel to said first axis of rotation; and further comprising a flexible wind shield attached to said flexible cover remote from said leading edge thereof and windable on and unwindable from said drum with said flexible cover, said flexible wind shield hanging down substantially perpendicular to said first axis of rotation when, and only when, said leading edge of said flexible cover is at a position remote from said drum.

10. A covering mechanism as recited in claim 1 wherein said platform body is on a motor vehicle having a hydraulic system, and wherein said hydraulic motor is connected to said motor vehicle hydraulic system.

11. A covering mechanism as recited in claim 10 wherein vehicle also includes a pneumatic system and an electrical system, said hydraulic circuit includes a control valve, said control valve is controlled by a pneumatic valve, sand said pneumatic valve is driven by said vehicle pneumatic system and controlled by said vehicle electrical system.

12. A covering mechanism as recited in claim 7 wherein said platform body is on a motor vehicle having a hydraulic system, and wherein said hydraulic motor is connected to said motor vehicle hydraulic system.

13. A covering mechanism as recited in claim 12 wherein said vehicle also includes a pneumatic system and an electrical system, said hydraulic circuit includes a control valve, said control valve is controlled by a pneumatic valve, and said pneumatic valve is driven by said vehicle pneumatic system and controlled by said vehicle electrical system.

14. A covering mechanism as recited in claim 9 wherein said platform body is on a motor vehicle having a hydraulic system, and wherein said hydraulic motor is connected to said motor vehicle hydraulic system.

15. A covering mechanism as recited in claim 14 wherein vehicle also includes a pneumatic system and an electrical system, said hydraulic circuit includes a control valve, said control valve is controlled by a pneumatic valve, and said pneumatic valve is driven by said vehicle pneumatic system and controlled by said vehicle electrical system.

16. A platform body covering mechanism for pulling a cover over and off a platform body, comprising:
a flexible cover having a leading edged;
at least a first cable connected to said flexible cover;
at least a first cable wheel engaging said first cable for effecting movement thereof;
a drum rotatable about an axis of rotation substantially parallel to said leading edge, and around which said flexible cover is wound and from which it is unwound;
a drive mechanism operatively connected to said first cable wheel to effect movement thereof to cause said first cable wheel to move said first cable and thereby pull said flexible cover over or off a platform body; and
a flexible wind shield attached to said flexible cover remote from said leading edge thereof and windable on and unwindable from said rum with said flexible cover, said flexible wind shield hanging down substantially perpendicular to said first axis for rotation when, and only when, said leading edge of said flexible cover is at a position remote from said drum.

17. A covering mechanism as recited in claim 16 wherein said flexible cover has a leading edge of relatively stiff but bendable material, and wherein said leading edge material is mounted at opposite ends thereof to first and second racks disposed along first and second opposite edges of the platform body, said tracks being closer together adjacent a center portion thereof than adjacent said drum so that as said flexible cover is pulled over the platform body said leading edge material bends upwardly.

* * * * *

UNITED STATES PATENT AND TRADEMARK OFFICE
CERTIFICATE OF CORRECTION

PATENT NO. : 5,354,113  Page 1 of 2
DATED : October 11, 1994
INVENTOR(S) : Kalervo Pettersson It is certified that error appears in the above-indentified patent and that said Letters Patent is hereby corrected as shown below:

In the drawing, delete sheet 1 consisted of figures 1 and 2, and substitute sheet 1 consisted of figures 1 and 2, as shown on the attached pages.

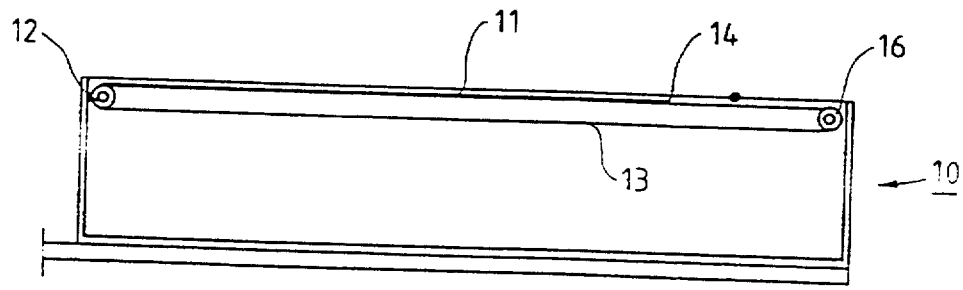

UNITED STATES PATENT AND TRADEMARK OFFICE
CERTIFICATE OF CORRECTION

PATENT NO. : 5,354,113
DATED : October 11, 1994
INVENTOR(S) : Kalervo Pettersson It is certified that error appears in the above-indentified patent and that said Letters Patent is hereby corrected as shown below:

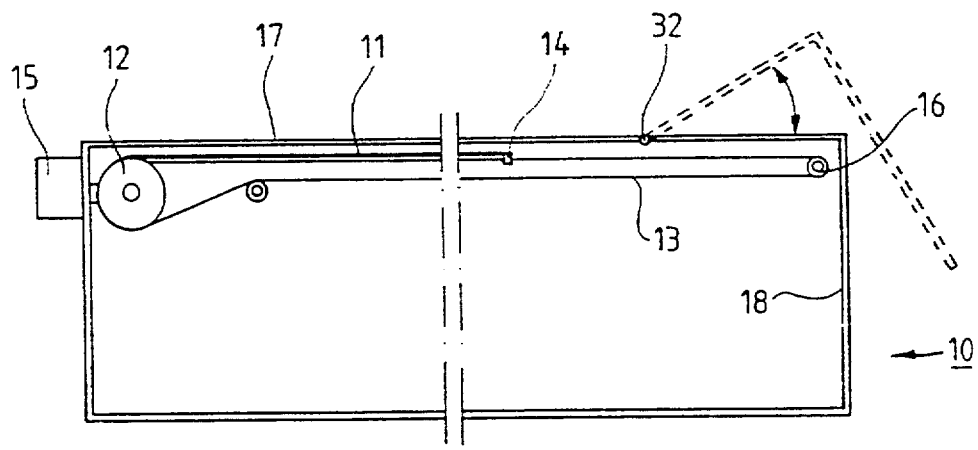

Signed and Sealed this

Tenth Day of January, 1995

Attest:

BRUCE LEHMAN

Attesting Officer

Commissioner of Patents and Trademarks